(12) United States Patent
Sasaki et al.

(10) Patent No.: US 7,204,646 B2
(45) Date of Patent: Apr. 17, 2007

(54) SUBSTRATE, OPTICAL FIBER CONNECTION END MEMBER, OPTICAL ELEMENT HOUSING MEMBER, AND METHOD OF FABRICATION OF AN OPTICAL MODULE AND THE SUBSTRATE

(75) Inventors: Junichi Sasaki, Tokyo (JP); Kazuhiko Kurata, Tokyo (JP); Takanori Shimizu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/319,413

(22) Filed: Dec. 29, 2005

(65) Prior Publication Data

US 2006/0110107 A1   May 25, 2006

Related U.S. Application Data

(62) Division of application No. 11/165,322, filed on Jun. 24, 2005, now Pat. No. 6,994,479, which is a division of application No. 09/851,968, filed on May 10, 2001, now Pat. No. 6,964,527.

(30) Foreign Application Priority Data

May 12, 2000   (JP)   ............... P2000-140859

(51) Int. Cl.
   *G02B 6/36*   (2006.01)
(52) U.S. Cl. ......................... 385/88; 385/63
(58) Field of Classification Search ............ 385/88, 385/60, 63, 65, 67, 77
   See application file for complete search history.

(56) References Cited

U.S. PATENT DOCUMENTS

| 5,163,118 A | 11/1992 | Lorenzo et al. ............ 385/132 |
| 5,325,455 A | 6/1994 | Henson et al. ............ 385/89 |
| 5,345,530 A | 9/1994 | Lebby et al. ............ 385/88 |
| 5,715,338 A | 2/1998 | Sjolinder et al. ............ 385/14 |
| 6,227,722 B1 | 5/2001 | Kropp ............ 385/88 |
| 6,312,581 B1 | 11/2001 | Bruce et al. ............ 205/124 |

(Continued)

FOREIGN PATENT DOCUMENTS

JP         5-249342         9/1993

(Continued)

OTHER PUBLICATIONS

Japanese Office Action dated Feb. 2, 2007, with partial English translation.

*Primary Examiner*—Hae Moon Hyeon
(74) *Attorney, Agent, or Firm*—McGinn IP Law Group, PLLC

(57) ABSTRACT

The present invention provides a substrate, an optical fiber connecting end member, an optical element-housing member, a light module, and a manufacturing method of the substrate. The substrate has a feature that can be stably realizable and having a simple structure and that a light waveguide formed on the substrate surface or an optical element formed thereon can be connected without core alignment to an optical element provided on the optical fiber of the optical fiber connector to be connected to the optical fiber connecting end member. The substrate of the present invention is characterized in steps 5 for positioning being formed on at least one side of the substrate 1 that provides the optical waveguide 4.

3 Claims, 10 Drawing Sheets

U.S. PATENT DOCUMENTS

| | | | |
|---|---|---|---|
| 6,352,372 B1 | 3/2002 | Shahid | 385/59 |
| 6,361,222 B1 | 3/2002 | Kawaguchi et al. | 385/88 |
| 6,374,021 B1 | 4/2002 | Nakanishi et al. | 385/49 |
| 6,393,171 B2 | 5/2002 | Sasaki et al. | 385/14 |
| 6,456,767 B2 * | 9/2002 | Terashima | 385/49 |
| 7,104,703 B2 * | 9/2006 | Nagasaka et al. | 385/88 |
| 7,108,432 B2 * | 9/2006 | Nagasaka | 385/89 |
| 2001/0028768 A1 | 10/2001 | Terashima | 385/49 |
| 2004/0240796 A1 * | 12/2004 | Moll et al. | 385/88 |

FOREIGN PATENT DOCUMENTS

| | | |
|---|---|---|
| JP | 7-128538 | 5/1995 |
| JP | 8-190031 | 7/1996 |
| JP | 8-248269 | 9/1996 |
| JP | 9-105838 | 4/1997 |
| JP | 10-293219 | 11/1998 |

* cited by examiner

SUBSTRATE, OPTICAL FIBER CONNECTION END MEMBER, OPTICAL ELEMENT HOUSING MEMBER, AND METHOD OF FABRICATION OF AN OPTICAL MODULE AND THE SUBSTRATE

CROSS-REFERENCE TO RELATED APPLICATION

The present Application is a Divisional Application of U.S. patent application Ser. No. 11/165,322, filed on Jun. 24, 2005 now U.S. Pat. No. 6,994,479, which is a Divisional Application of U.S. patent application Ser. No. 09/851,968, filed on May 10, 2001, now U.S. Pat. No. 6,964,527, issued Nov. 15, 2005.

BACKGROUND OF THE INVENTION

1. Field of the Invention

The present invention relates to a substrate, optical fiber connecting terminal member, optical element housing member, and method of fabrication of an optical module and the substrate, and in particular to a substrate, an optical fiber connecting end member, and an optical element housing member that can connect without alignment of the cores and at high precision an optical element mounted on an optical waveguide on a substrate or mounted on the substrate to an optical fiber of an optical fiber connector that is connected to an optical fiber connecting end member or an optical element provided on an optical element housing member, and a fabrication method for an optical module and a substrate.

2. Description of the Related Art

In broadband optical communication networks and high-speed data transmission between computers, parallel optical modules and multiple core optical transmission and reception modules and the like are necessary. An increasingly higher quality and decreasing cost are required for these modules, and reducing the number of parts, simplification of the module structure, and decreased energy consumed during the fabrication process and the like are indispensable for the further improvement.

When an optical module is assembled on the device, an ordinary pigtail module entails the problem of processing of the optical fiber's excess length, which means that extra space is necessary in order to accommodate the optical fiber mounted in the optical module. Therefore, using an optical module with an attached optical fiber receptacle that can be detached from the optical fiber is desired.

In order to apply the multiple core optical fiber receptacle structure to this optical module, it is necessary to align with high precision the relative positions of a guide pin or a guide pin insertion hole, which are used to connect to the multiple core optical fiber connector, and the optical axis of the optical module.

Active alignment, for example, can be considered to be such a core alignment method. In this alignment method, positions are adjusted by moving the optical module and the receptacle relative to each other while the optical module is emitting light, so that the light is most strongly incident on the optical fiber. Then this receptacle is attached to the optical module.

However, in this active alignment, because the position adjustment of the optical module and the receptacle must be carried out using a precision manual operation, the optical module becomes a factor that causes a high cost. In order to decrease the cost of the optical module, this kind of alignment by a precision manual operation should be avoided, and an optical module having a structure that can be assembled without core alignment is required.

FIG. 15 is an exploded perspective view showing the optical waveguide part disclosed in Japanese Unexamined Patent Application, First Publication, No. Hei 8-248269, which is one example of a multiple core optical module having a structure whose assembly does not require core alignment, and FIG. 16 is a partial cross-sectional perspective view of the same. In this optical waveguide path, both ends 100a and 100b of an optical waveguide body 100 are respectively inserted into and fixed in separate connecting end members 101 and 101.

The optical waveguide body 100 provides a substrate 102, a cladding 103, and an optical waveguide core 104 comprising a plurality of cores 104a. On the upper surface of the cladding 103, two V-shaped grooves 105a and 105b are formed on respective sides of the optical waveguide core 104.

On the connecting terminal member 101, a through hole 107 and guide pin insertion holes 108a and 108b that pass from the one end surface 106a thereof to the other end surface 106b thereof are formed, and in the through hole 107, V-shaped projections 109a and 109b that engage the V-shaped grooves 105a and 105b are formed.

In this optical waveguide part, the one end 100a of the optical waveguide body 100 is inserted into the through hole 107 of the connecting end member 101 such that the V-shaped grooves 105a and 105b thereof are engaged with the V-shaped projections 109a and 109b. The end surface of each core 104a of the light guiding core 104 and the end surface 106a of the connecting end member 101 are made flush to each other, and while being held in this state, both are attached and fixed, and thereby the optical waveguide body 100 can be fixed to the connecting end member 101 without core alignment.

However, in this optical waveguide part, because the optical waveguide body 100 is inserted into the connecting end member 101 while the V-shaped grooves 105a and 105b are engaged in the V-shaped projections 109a and 109b, there is the problem that the V-shaped grooves 105a and 105b and the V-shaped projections 109a and 109b can be easily broken.

Thus, an optical waveguide that avoids this problem is disclosed in Japanese Unexamined Patent Application, First Publication, No. Hei 8-248269.

As is shown in FIG. 17, this optical waveguide part is structured so that substantially identically shaped V-shaped grooves 111a and 111b are formed at positions in the through hole 107 of the connecting end member 101 opposite to the V-shaped grooves 105a and 105b of the optical waveguide body 100, and the respective optical fibers 112 and the like are interposed between the V-shaped grooves 105a and 111a and between the V-shaped grooves 105b and 111b.

In addition, the optical waveguide apparatus disclosed in Japanese Unexamined Patent Application, First Publication, No. Hei 9-105838, is another example that avoids the problem described above.

As is shown in FIG. 18, in this optical waveguide apparatus, the connecting end members 202 and 203, which surround and engage both side surfaces and the upper surface 210 of the waveguide chip 201 by the engaging recess 216, engage and fasten the connecting end surfaces 225a and 225b of the waveguide chip 201 that forms the core 206 and the clad 205 on the substrate 210, to form the optical waveguide apparatus shown in FIG. 19.

In this optical waveguide apparatus, both end sides of the optical fiber 209 are sandwiched between the V-shaped grooves 208a and 208b formed on both sides of the upper surface 210 of the waveguide chip 201 and the inverse V-shaped grooves 214 and 215 formed at positions corresponding to the V-shaped grooves 208a and 208b of the engagement recess 216 of the connecting end members 202 and 203, and thereby the positioning of the waveguide chip 210 and the connecting end members 202 and 203 is carried out.

However, in the conventional optical waveguide part and the optical waveguide apparatus described above, an optical fiber, which is a very small part, must be aligned with and mounted on a V-shaped groove and an inverse V-shaped groove, and there is the problem that obtaining high precision is difficult.

In addition, the problem with the optical waveguide part and optical waveguide apparatus is the precision of the V-shaped grooves. Thus, a method that improves the precision of the V-shaped groove is disclosed in Japanese Unexamined Patent Application, First Publication, No. Hei 9-105838.

This method includes a method of forming a V-shaped groove using machine processing and a method of forming a rectangular groove by etching processing, but generally, in these methods, achieving sub-micron level precision is difficult, and applying these methods to single mode optical fiber arrays presents problems.

SUMMARY OF THE INVENTION

In consideration of the above described problems, it is an object of the present invention to provide an optical waveguide on a substrate or an optical element mounted on a substrate and an optical fiber of an optical fiber connector connected to an optical fiber connecting end member or an optical element provided on an optical element housing member that can be connected without core alignment and at high precision, and furthermore, has a simple structure, and a substrate that can be stably realized, and an optical fiber connecting end member, an optical element housing member, and a fabrication method of an optical module and a substrate.

In order to resolve the problems described above, the present invention uses the following type of substrate, optical fiber connecting end member, optical element housing member, and fabrication method for an optical module and the substrate.

Specifically, in a substrate that provides an optical waveguide, according to a first aspect of the present invention, the substrate is characterized in steps for positioning being formed on at least one side of this substrate.

In a second aspect of the present invention, this substrate according to the first aspect is characterized in an optical element mounted on the optical waveguide which is connected thereto.

In a third aspect of the present invention, the substrate according to the first and second aspects is characterized in inclined grooves that incline relative to the propagation direction of the light being formed on the optical waveguide, and a light reflecting device that reflects the light propagated through the optical waveguide to the outside of the optical waveguide being provided.

In a fourth aspect of the present invention, the substrate according to the first and second aspects is characterized in inclined grooves that incline relative to the propagation direction of the light being formed on the optical waveguide, and an optical wavelength selecting device that selects the light having a wavelength within a desired range from the light propagated through the optical waveguide and extracts it to the outside of the optical waveguide being provided on the inclined groove.

In a fifth aspect of the present invention, in a substrate on which optical elements are mounted, the substrate is characterized in steps for positioning being formed on at least one side of this substrate.

In a sixth aspect of the present invention, in an optical fiber connecting end member having formed therein a hole for accommodating and fixing one end of the substrate and optically connecting the substrate to the optical fiber, an optical fiber connecting end member is characterized insteps for positioning the substrate being formed on the substrate in the hole.

In a seventh aspect of the present invention, in an optical element housing member having formed therein a hole for accommodating and fixing one or the other end of the substrate and optically connecting the substrate to the optical element, the optical element housing member is characterized in steps for positioning the substrate being formed in the hole.

In an eighth aspect of the present invention, the optical module is characterized in providing a substrate according to any one of the first through fifth aspects and the optical fiber connecting end member according to the sixth aspect and/or the optical element housing member according to the seventh aspect.

In a ninth aspect of the present invention, in the optical module according to the eighth aspect, an optical module is characterized in two optical fiber connecting end members being disposed opposite to each other so as to sandwich the optical element housing member, and the substrate on which the optical fiber connecting end member is accommodated and fixed and the optical element of the optical element housing member being optically connected.

In a tenth aspect of the present invention, in the optical module according to the eighth and ninth aspects, the optical module is characterized in the substrate being pressed against the optical fiber connecting end member by the urging force of a flexible member.

In an eleventh aspect of the present invention, a fabrication method for the substrate according to any of the first thorough fifth aspects, is characterized in steps for positioning being formed on at least one side of the substrate by anisotropic etching.

DETAILED DESCRIPTION OF THE INVENTION

Each embodiment of the optical module and the fabrication method for the same of the present invention will be explained referring to the figures.

First Embodiment

Figure 1:
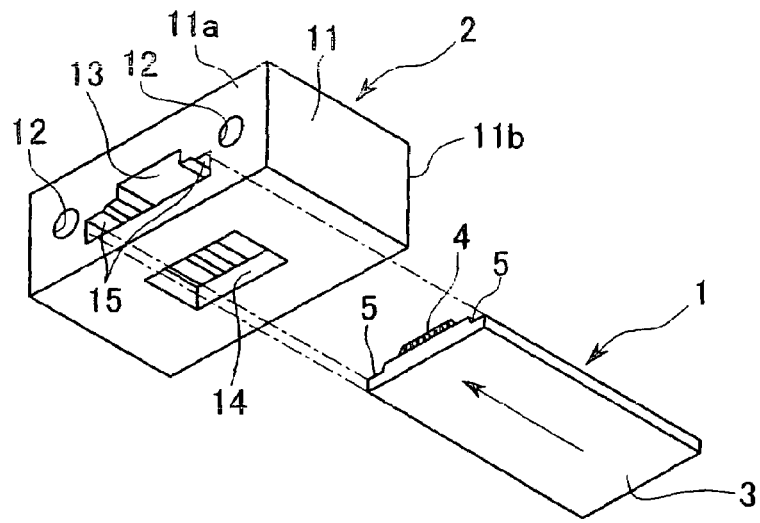
FIG. 1 is an exploded perspective drawing showing the optical module according to the first aspect of the present invention.
Figure 2:
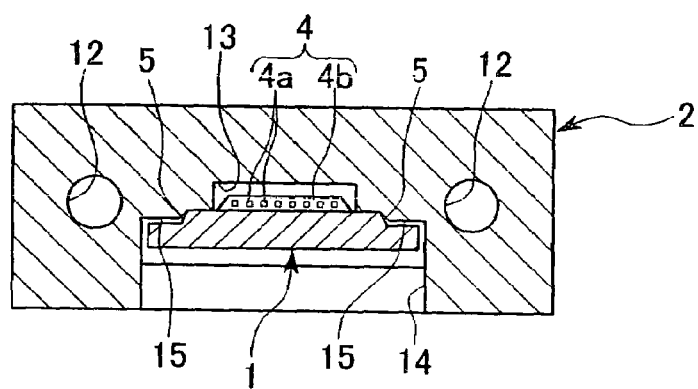
FIG. 2 is a cross-sectional drawing showing the optical module according to the first aspect of the present invention.

FIG. 1 is an exploded drawing showing the optical module according to the first embodiment of the present invention, and FIG. 2 is a cross-sectional drawing of the same optical module. In the figures, reference numeral 1 is an optical waveguide substrate (a substrate that provides an optical waveguide), and reference numeral 2 is an optical fiber connecting end member that accommodates and fixes the end of the optical waveguide substrate 1.

In the optical waveguide substrate 1, a silicon optical waveguide 4, which has a multiple core structure wherein a plurality of cores 4a are buried in the clad 4b, is formed on a rectangular Si substrate 3, and on both sides of the upper surface of this Si substrate 3, high precision steps 5 and 5 are formed along the longitudinal direction thereof by anisotropic etching of the Si.

One end surface 11a of the plastic housing 11 of the optical fiber connection end member 2 is flattened by grinding, and guide pin insertion holes 12 and 12 into which guide pins are inserted while being connected to the optical fiber connector and a through hole 13 for accommodating and fixing the end surface of the optical waveguide substrate 1 are formed so as to pass from one end surface 11a to the other end surface 11b. In this though hole 13, a cavity 14 that opens on the bottom surface of the housing 11 is formed, and at the same time, on the inside thereof, steps 15 and 15 are formed so as to have a shape that is complementary to the steps 5 and 5, which are formed on the optical waveguide substrate 1. The diameter of these guide pin insertion holes 12 is, for example, 0.7 mm.

The optical fiber connecting end member 2 is formed by transfer molding such that the relative positions of the steps 15 and 15 and the guide pin insertion holes 12 and 12 have a sufficient precision. In addition, the angle of inclination of the steps 5 and 5 and the steps 15 and 15 is, for example, 45 degrees.

In this optical module, after inserting the optical waveguide substrate 1 into the through hole 13 of the optical fiber connecting end member 2, using a pressing member and the like, this optical waveguide substrate 1 is pressed from the cavity 14 towards the upper surface of the optical fiber connection end member 2, and the optical waveguide substrate 1 is attached and fixed to the optical fiber connection end member 2 by an epoxy glue and the like.

At this time, the steps 5 and 5 of the optical waveguide substrate 1 are automatically aligned at high precision with the steps 15 and 15 of the optical fiber connection end member 2.

Due to this optical module, along the longitudinal direction on both sides of the optical waveguide substrate 1, the steps 5 and 5 are formed, and in the though hole 13 of the optical fiber connection end member 2, the steps 15 and 15 are formed so as to have a shape that is complementary to the steps 5 and 5, and thus, when this optical waveguide substrate 1 is anchored and fastened to the optical fiber connection end member 2, these steps 5 and 5 are aligned with each other by the steps 15 and 15, and high precision positional alignment become possible.

Thereby, the relative positions of the core 4a of the optical waveguide substrate 1 and the guide pin insertion holes 12 and 12 of the optical fiber connection end member 2 can be aligned at high precision without core alignment, and thus the core 4a of the optical waveguide substrate 1 and the optical fiber of the optical fiber connector connected to the optical fiber connection end member 2 can be connected at high precision and without core alignment.

Second Embodiment

Figure 3:
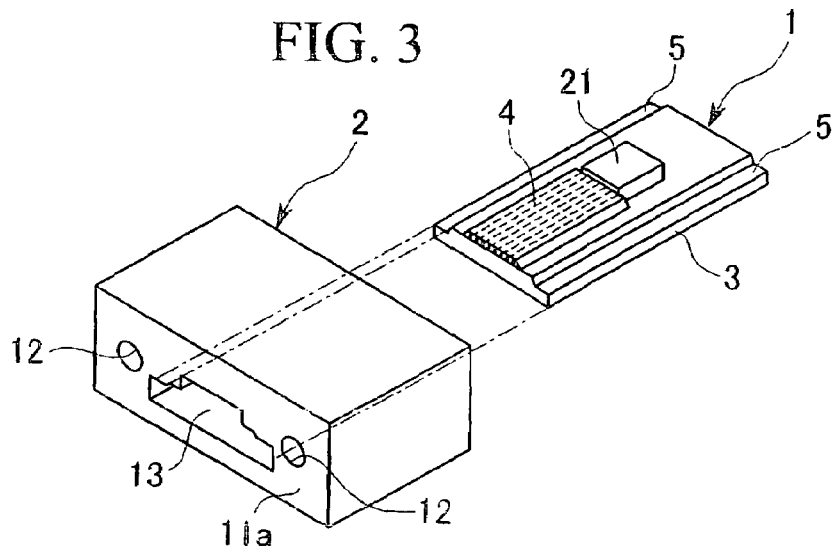
FIG. 3 is an exploded perspective drawing showing the optical module according to the second aspect of the present invention.

FIG. 3 is an exploded perspective drawing showing the optical module according to the second embodiment of the present invention, and the point of difference between the optical module according to this embodiment and the optical module according to the first embodiment described above is that, in contrast the first embodiment in which there is only a structure in which a silicon optical waveguide 4 is formed such that the optical waveguide substrate 1 has a plurality of cores 4a buried in a clad 4b on the Si substrate 3, in the optical module according to the present embodiment, a semiconductor laser (optical element) 21 for inputting a laser beam into the optical waveguide 4 is mounted on the Si substrate 3, thereby making a hybrid light condensing module.

In this optical module, in addition to the optical waveguide 4, a semiconductor laser 21, which is an optical element, is mounted on the Si substrate 3, and thus the optical module can be hybridized.

Third Embodiment

Figure 4:
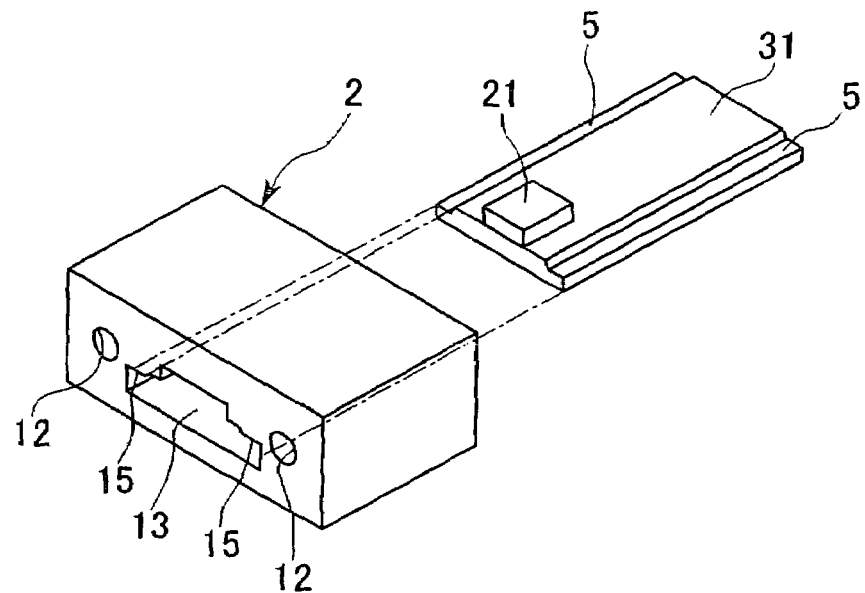
FIG. 4 is an exploded perspective drawing showing the optical module according to the third aspect of the present invention.

FIG. 4 is an exploded perspective drawing showing the optical module according to the third embodiment of the present invention, and the point of difference between the optical module according to this embodiment and the optical module according to the first embodiment is that, in contrast to the first embodiment in which there is a structure in which a silicon optical waveguide 4 is formed such that the optical waveguide substrate 1 has a plurality of cores 4a buried in a clad 4b on the Si substrate 3, in the optical module according to the present embodiment, the steps 5 and 5, like those of the first embodiment, are formed using anisotropic etching on both sides of a Si sub-mount (a substrate providing an optical element) 31 on which is mounted a semiconductor laser 21, this Si sub-mount 31 is inserted in the optical fiber connecting end member 2, position alignment is carried out such that the light emitting surface of the semiconductor laser 21 is flush with the end surface 11a of the optical fiber connection end member 2, and this Si sub-mount 31 is fixed to the optical fiber connecting end member 2 by an adhesive and the like.

In this optical module, the semiconductor laser 21 and the external optical fiber (not illustrated) are directly linked without interposing an optical waveguide. In addition, the semiconductor laser 21 is automatically mounted at high precision with a predetermined position on the Si sub-mount 31 by self-alignment using solder bumps.

According to this optical module, due to having this type of structure, a short optical fiber and optical waveguide do not need to be mounted in the optical module, the number of parts can be reduced, fabrication cost can be reduced, and the price made inexpensive.

In addition, because the number of optical joints becomes few, the reflection and linking loss in the optical linking part can be attenuated. In addition, the linking between the optical element and the optical fiber can be attenuated without aligning the optical axes.

Moreover, this optical module can be structured such that not only the semiconductor laser 21, but other light emitting elements, light receiving elements such as photodiodes (PD) and avalanche photodiodes (APD), or a plurality of optical elements are mounted. In addition, it can be structured so that the vicinity of the light emitting elements such as the semiconductor laser 21 or the light receiving elements such as the photodiode (PD) and the avalanche photodiodes (APD) can be sealed by a transparent resin.

In the case of being sealed in a transparent resin, the resin extrudes to the outside from the through hole 13 of the optical fiber connecting end member 2, but this extrusion resin can be cut off and flattened by grinding. In addition, if the resin sealing is carried out in advance while the opening on the optical fiber side of the through hole 13 of the optical fiber connecting end member 2 is covered by a glass plate and the like, a flat end surface can be obtained without requiring grinding. In addition, applying a non-reflecting coating to the glass plate is effective as a reflection prevention measure.

Furthermore, mounting electrical components such as the driver for a laser or preamps for light reception elements on the Si sub-mount 31 is effective in high-speed operation of the optical module because the wiring length between these electrical components and optical elements can be shortened.

Fourth Embodiment

Figure 5:
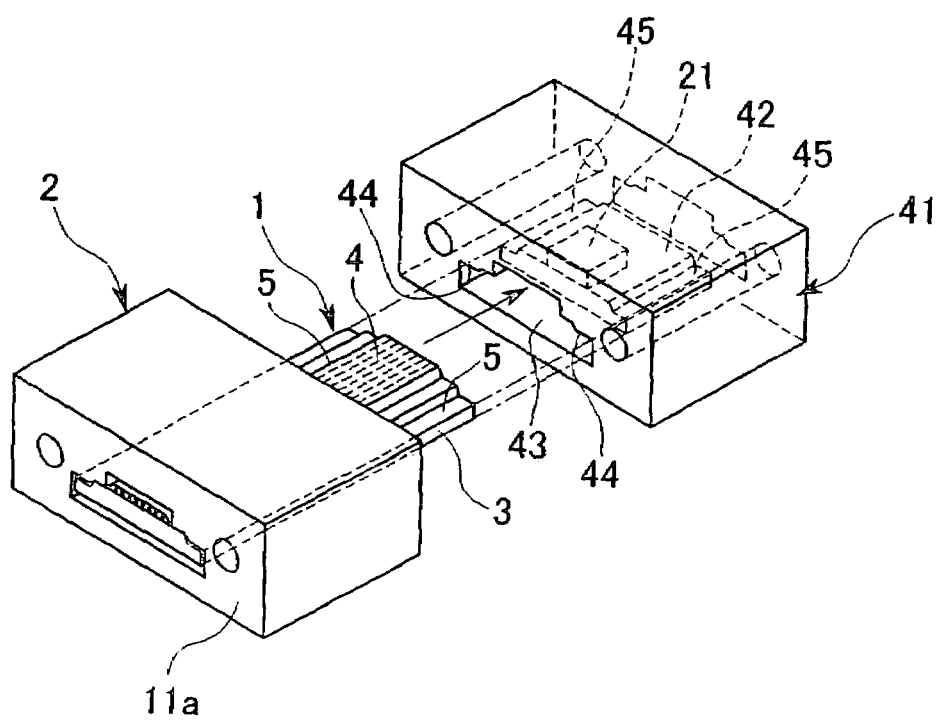
FIG. 5 is an exploded perspective drawing showing the optical module according to the fourth aspect of the present invention.

FIG. 5 is an exploded perspective drawing showing an optical module according to the fourth embodiment of the present invention, and the optical module of the present embodiment is structured such that the Si sub-mount 42 on which the semiconductor laser 21 is mounted is inserted into the optical element housing member 41 by a self-aligning method using solder bumps.

Like the optical fiber connection end member 2, a through hole 43 and steps 44 are formed on this optical element housing member 41, and steps 45 having a shape complementary to the steps 44 are formed on both sides of the Si sub-mount 42.

In this optical module, the precision of the attachment position of the Si sub-mount 42 and the optical element housing member 41 is attained by aligning and fixing the steps 45 formed on the Si sub-mount 42 and the steps 44 formed on the optical element housing member 41.

Next, the end of the optical waveguide substrate 1 is inserted into the optical fiber connection end member 2. At this time, like the first embodiment, the optical waveguide substrate 1 and the optical fiber connection end member 2 are positioned and fixed. Next, the other end of the optical waveguide substrate 1 is inserted into the through hole 43 of the optical element housing member 41. At this time, the precision of the connection position of the optical waveguide substrate 1 and the optical element housing member 41 can be attained by aligning and fixing the steps 5 formed on the Si substrate 3 and the steps 44 formed on the optical element housing member 41. In addition, the precision of the position of the semiconductor laser 21 on the Si sub-mount 42 can be attained by being aligned by the above-described self-alignment.

According to the above, the steps 5 formed on the optical waveguide substrate 1 and the steps 44 formed on the optical element housing element 41 are aligned and fixed, and thereby the connection between the semiconductor laser 21 and the optical waveguide substrate 1 can be attained without alignment. This semiconductor laser 21 is linked to the external optical fiber via the optical waveguide 4.

In the second embodiment described above, the end face 11a of the optical fiber connecting end member 2 must be ground while the semiconductor laser 21 is mounted on the optical waveguide substrate 1, but in the present embodiment, the semiconductor laser 21 can be assembled after grinding the end surface 11a of the optical fiber connecting end member 2 beforehand. Therefore, this structure is effective in the case the optical elements such as the mounted semiconductor laser 21 should not be subject to vibration during grinding.

Fifth Embodiment

Figure 6:
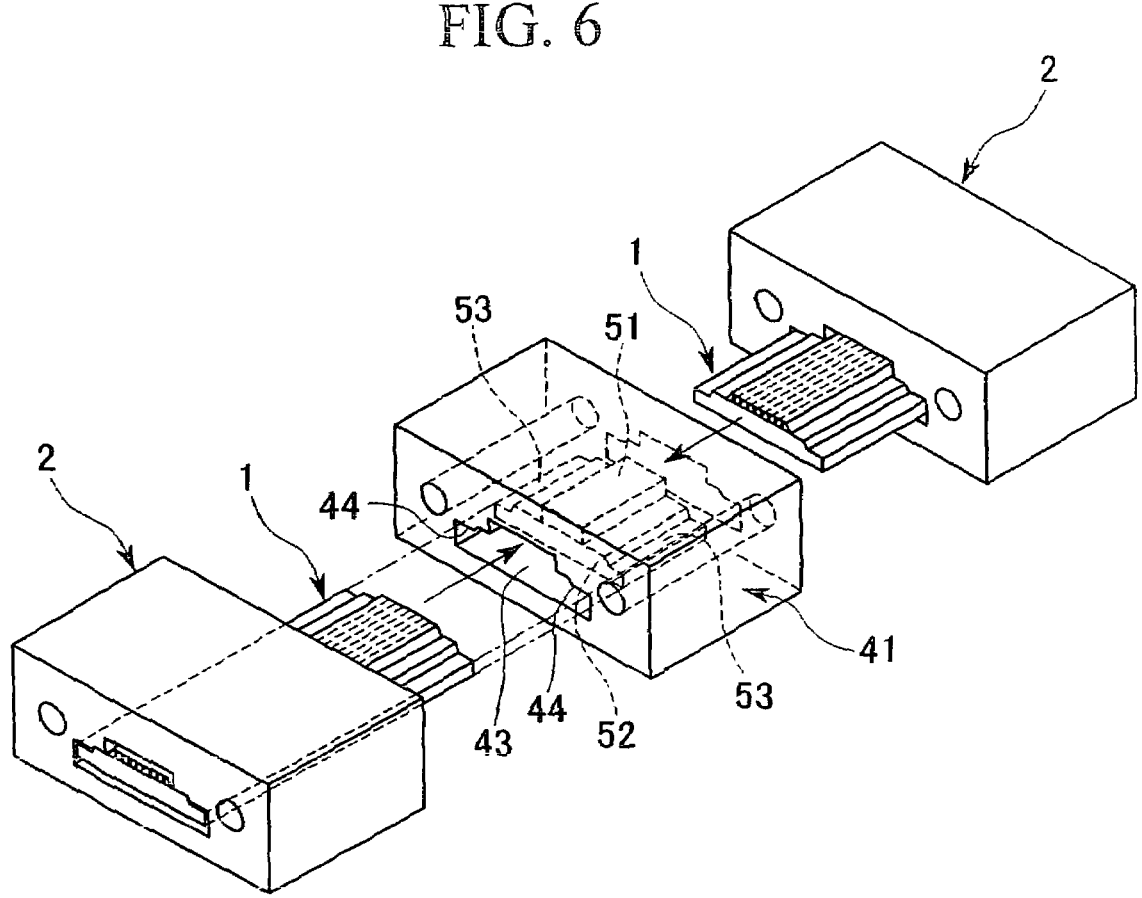
FIG. 6 is an exploded perspective drawing showing the optical module according to the fifth aspect of the present invention.

FIG. 6 is an exploded perspective drawing showing the optical module according to the fifth embodiment of the present invention. The optical module according to this embodiment is structured such that a Si sub-mount 52 on which a semiconductor optical amplifier 51 is mounted is inserted into an optical element housing member 41.

Steps 53 that have a shape complementary to those of the steps 44 of the optical element housing member 41 are formed on both sides of this Si sub-mount 52.

The precision of the attachment position between the Si sub-mount 52 and the optical element housing member 41, like the fourth embodiment, can be attained by aligning and fixing the steps 53 formed on the Si sub-mount 52 and the steps 44 formed on the optical element housing member 41.

In addition, the precision of the position of the semiconductor optical amplifier 51 on the Si sub-mount 52 is attained by self-alignment.

Next, two optical connecting end members 2 having optical waveguide substrates 1 inserted and fixed are prepared, these are disposed opposite to each other so as to sandwich the optical element housing member 41, and the respective ends of the optical waveguide substrates 1 are inserted from both sides into the through hole 43 of the optical element housing member 41. Because the other ends of the respective optical waveguide substrates 1 are inserted and fixed in the optical connecting end member 2, they can be connected to external optical fibers.

The precision of the attachment position of the optical element housing member 41 and the optical waveguide substrates 1 and 1, and the precision of the attachment position of the optical waveguide substrate 1 and the optical fiber connecting end member 2 is attained in the same manner as the optical module according to the fourth embodiment.

Sixth Embodiment

Figure 7:
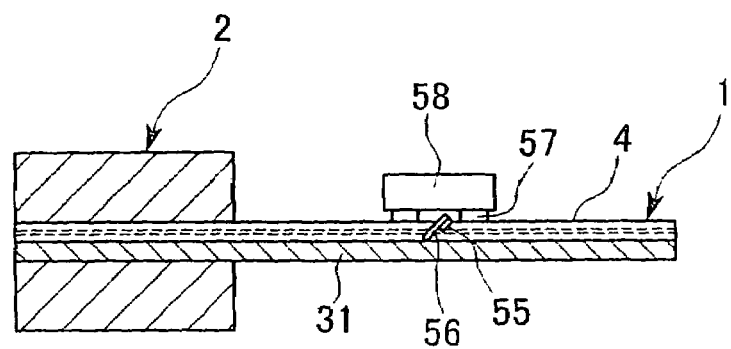
FIG. 7 is a cross-sectional drawing showing the optical module according to the sixth aspect of the present invention.

FIG. 7 is a cross-sectional drawing showing the optical module according to the sixth embodiment of the present invention, and the optical module according to the present embodiment has a diagonal groove 55 formed on the optical waveguide 4 of the optical waveguide substrate 1, the mirror 56 is inserted into the diagonal groove 55, and then the light receiving element 58 is mounted on bumps 57.

In this optical module, the light that propagates through the optical waveguide 4 is reflected by the mirror 56, and is incident on the light receiving element 58.

Here, when the mirror is a wavelength selection film, in the case that a multiplexed optical signal propagates through the optical waveguide 4, the light can be received by selectively extracting a specific wavelength among these optical signals.

In addition, a plane light emitting laser can be mounted instead of the light receiving element 58. Thereby, a light transmitting module using a plane light emitting laser can be made.

Seventh Embodiment

Figure 8:
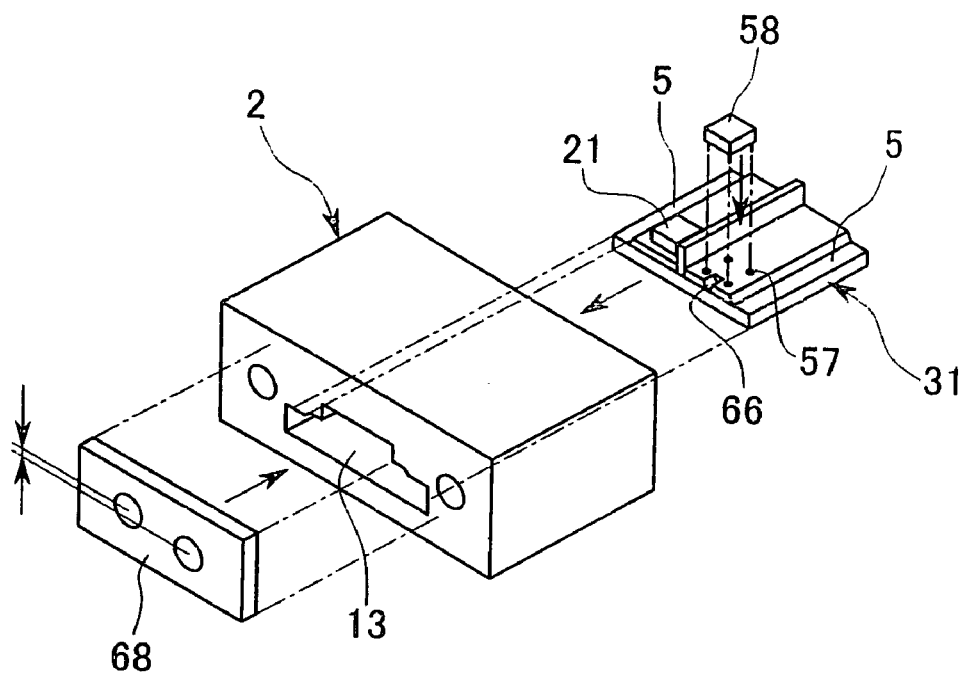
FIG. 8 is an exploded perspective drawing showing the optical module according to the seventh aspect of the present invention.
Figure 9:
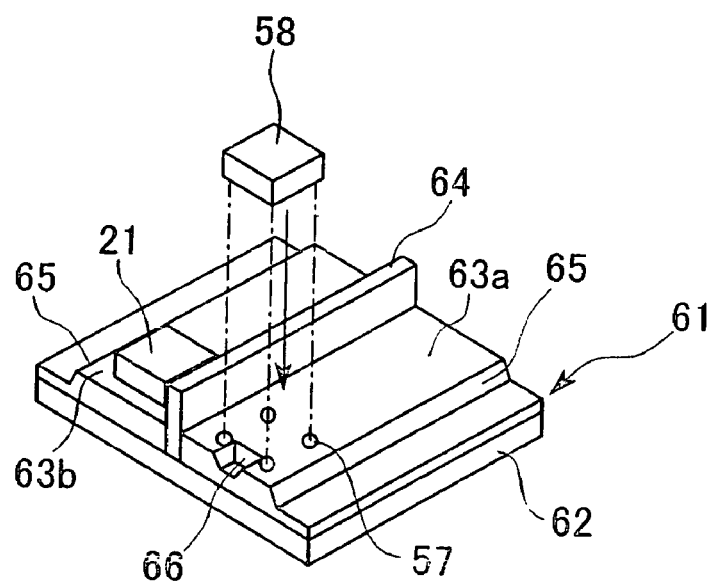
FIG. 9 is an enlarged perspective drawing showing the Si sub-mount of the optical module according to the seventh embodiment of the present invention.

FIG. 8 is an exploded perspective drawing showing an optical module according to the seventh embodiment of the present invention, and FIG. 9 is an enlarged perspective drawing showing the Si sub-mount of the optical module. In the optical module according to the present embodiment, the semiconductor laser 21 and the plane light receiving type light receiving element 58 are mounted on the Si sub-mount 61 without alignment and at high precision by self-alignment.

In this Si sub-mount 61, a plurality (two in this case) of partitioned Si substrates 63*a* and 63*b* are attached to a ceramic plate 62, and an electromagnetic shield plate 64 comprising an iron plate is provided between these Si substrates 63*a* and 63*b*. Steps 65 are respectively formed along the mutually separated sides of the Si substrates 63*a* and 63*b*.

In addition, on the Si substrate 63*a* on which the light receiving element 58 is mounted, a V-shaped groove mirror 66 is formed by anisotropic etching. A flat micro-lens 68 is attached over the through hole 13 of the optical fiber connecting end member 2 into which this Si sub-mount 61 is inserted. The V-shaped groove mirror 66 can be formed at the same time that the steps 65 are formed on the Si substrate 63*a*.

In this optical module, the shape of the semiconductor laser 21 and the light receiving element 58 have, for example, a 300 µm square and a thickness of 100 µm, and the solder bumps 57 for mounting these on the Si sub-mount 61 preferably use a solder having as a main component Au—Sn. The shape of these solder bumps 57 has, for example, a width of 25 µm, a length of 140 µm, a height of 15 µm, with four bumps per element.

Figure 10A:
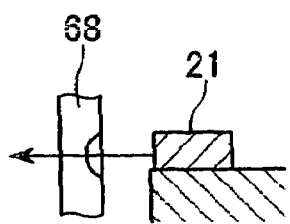
FIGS. 10A and 10B are cross-sectional drawings showing an example of the compensated step of an optical module according to a seventh embodiment of the present invention.

In this optical module, because the V-shaped mirror 66 is formed, a step at the point of emission of the semiconductor laser 21 and the point of incidence on the light receiving element 58 is produced, but this step can be compensated by attaching the flat micro-lens 68 and providing an offset for the height at the center of the lens. This means that, as shown in FIG. 10A, the light emitted from the semiconductor laser 21 passes directly through the flat micro-lens 68, and is concentrated on the optical fiber.

Figure 10B:
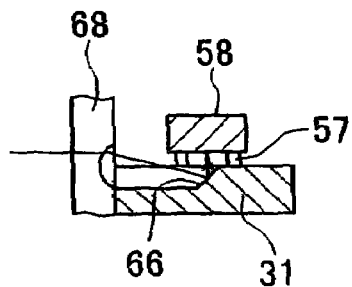

In addition, as shown in FIG. 10B, the light that progresses towards the light receiving element 58 is refracted downwards by the flat micro-lens 68 offset from the optical axis, and then is incident on the light receiving element 58 by being reflected upward by the V-shaped mirror 66.

Due to being structured in this manner, the electrical cross-talk that occurs between the semiconductor laser 21 and the signal lines of the light receiving element 58 can be attenuated.

Eighth Embodiment

Figure 11:
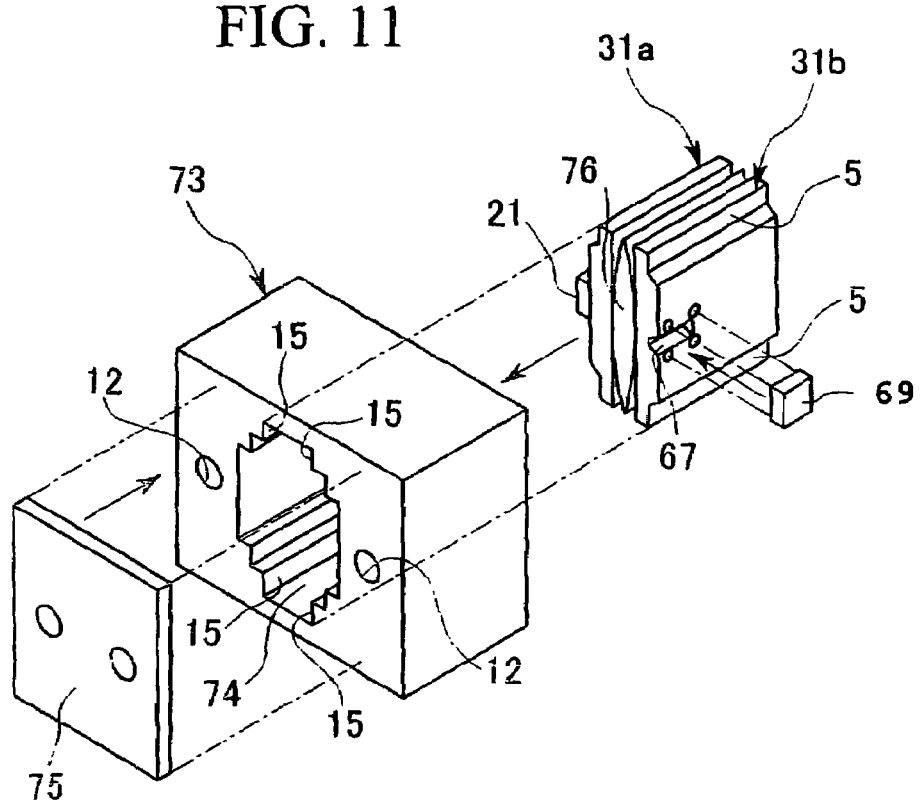
FIG. 11 is a perspective drawing showing the optical module according to the eighth aspect of the present invention.

FIG. 11 is a perspective drawing showing the optical module according to the eighth embodiment of the present invention. The optical module according to the present embodiment is formed such that two Si sub-mounts 31*a* and 31*b* are inserted and fixed in a through hole 74 of an optical fiber connecting end member 73. A flat micro-lens 75 is attached to this through hole 74.

The semiconductor laser 21 is mounted on the first Si sub-mount 31*a*, and the plane light receiving type light receiving element 69 is mounted on the second Si sub-mount 31. A V-shaped groove mirror 67 is formed below the light receiving element 69. In addition, a flat spring 76 is provided between the two Si sub-mounts 31*a* and 31*b*.

The steps 5 are respectively formed on the first and second Si sub-mounts 31*a* and 31*b*, and the steps 15 are respectively formed on the optical fiber connecting end member 73, and these steps 5 and 15 are aligned, positioned, and anchored.

In this manner, by separating the semiconductor laser 21 and the Si sub-mount on which the light receiving element 69 is mounted, the gap of the guide pin insertion hole 12 becomes narrow, and compared to the case where the Si sub-mount 31 is disposed between the two guide pin insertion holes 12, there is extra free mounting surface. In addition, the electrical cross-talk that occurs between the semiconductor laser 21 and the signal lines of the light receiving element 69 is attenuated.

In this optical module, a flat spring 76 is provided between the two Si sub-mounts 31*a* and 31*b*, and the respective steps 5 are pressed against the steps 15 of the optical fiber connecting end member 73, and thereby these members can be reliably and easily positioned and anchored.

Ninth Embodiment

Figure 12:
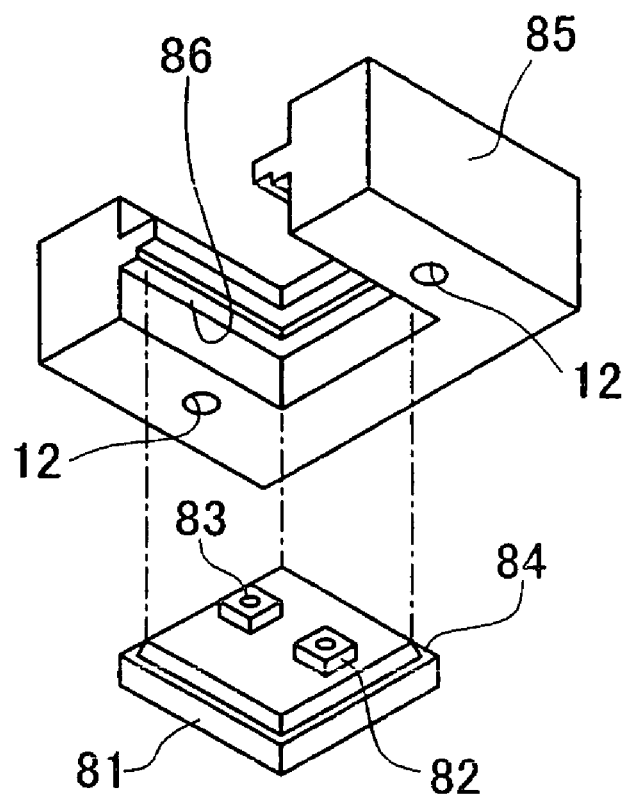
FIG. 12 is an exploded perspective drawing showing the optical module according to the ninth aspect of the present invention.

FIG. 12 is an exploded perspective drawing showing an optical module according to a ninth embodiment of the present invention. In the optical module according to the present embodiment, a plane light emitting semiconductor laser 82 and a plane input type light receiving element 83 are mounted on the Si sub-mount 81, and in proximity thereto, the steps 84 are formed. In addition, steps 86 that have a shape complementary to the steps 84 are also formed on the optical fiber connecting end member 85.

The precision of the position of these optical elements on the Si sub-mount 81 is attained using passive alignment by aligning markers.

In this optical module, the optical fiber connecting end member 85 is positioned and fixed with high precision on the Si sub-mount 81 by aligning the steps provided on both sides.

In this embodiment, the optical axes of the plane light emitting semiconductor laser 82 and the plane input type light receiving element 83 are perpendicular relative to the Si sub-mount 81, and thus the guide pin insertion holes 12 are formed so as to be perpendicular to the Si sub-mount 81.

Figure 13:
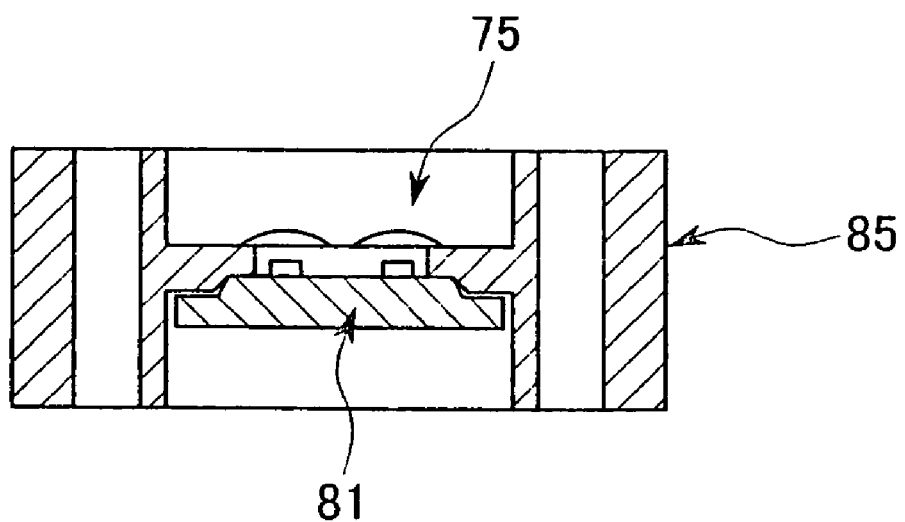
FIG. 13 is cross-sectional drawing showing a modified example of the optical module according to the ninth aspect of the present invention.

FIG. 13 is a cross-sectional figure showing a modified example of the optical module of the present embodiment, and formed so that the Si sub-mount 81 is positioned and fixed in the lower part of the optical fiber connecting end member 85 and a flat micro-lens 75 is positioned and fixed in the upper part of the same.

Tenth Embodiment

FIG. 14 is a process diagram showing the fabrication method of the optical module according to a tenth embodiment of the present invention. First, as shown in FIG. 14A, an optical waveguide layer 92 comprising silicon is formed on the Si substrate 91. Here, the thickness of the Si substrate 91 is 0.8 mm, and on this Si substrate 91, the optical waveguide layer 92 is deposited by chemical vapor phase deposition (CVD). In addition, the cross-sectional angle of the cores 4a of the optical waveguide is a 5 μm, and the thickness of the clad 4b above and below the cores 4a is 15 μm. The gap between cores 4a is, for example, 250 μm, and 12 cores 4a are formed on one optical waveguide substrate.

Figure 14A:
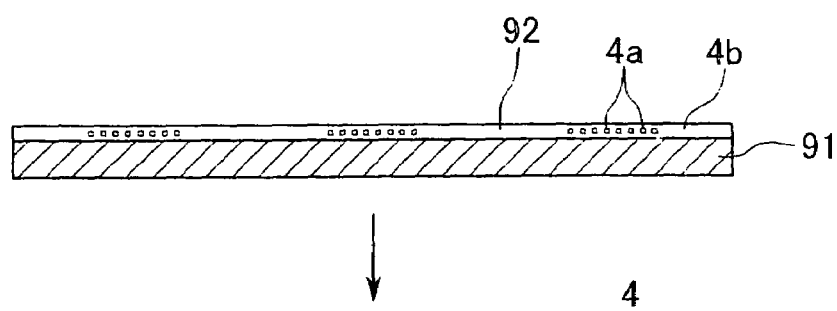
FIG. 14A to 14D are process drawings showing the fabrication method for the optical module according to the tenth embodiment of the present invention.
Figure 14B:
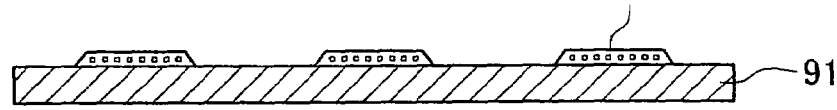

Next, as shown in FIG. 14B, the unnecessary portion of the optical waveguide layer 92 is removed by etching, and the optical waveguide 4 is formed. This etching is carried out using buffered hydrofluoric acid 16.

Figure 14C:
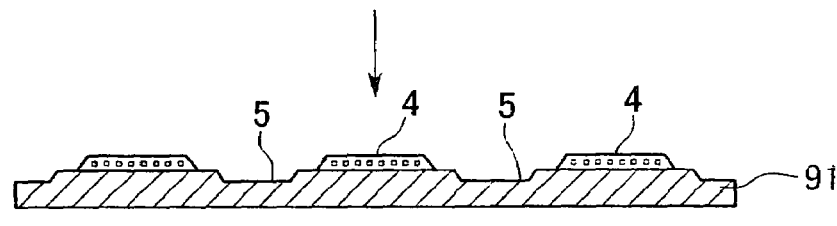

Next, as shown in FIG. 14C, the steps 5 are formed on both sides of the optical waveguide 4 by anisotropic etching of the Si substrate 91. This anisotropic etching is carried out using a potassium hydroxide (KOH) solution.

The thickness of the etched part of the Si substrate 91 is 150μ, the width is about 300 μm, and the angle of the inclined surface caused by the etching is 54.7 degrees with respect to the Si substrate surface.

Figure 14D:
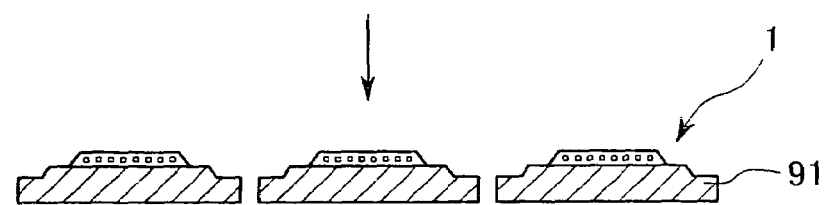
Figure 15:
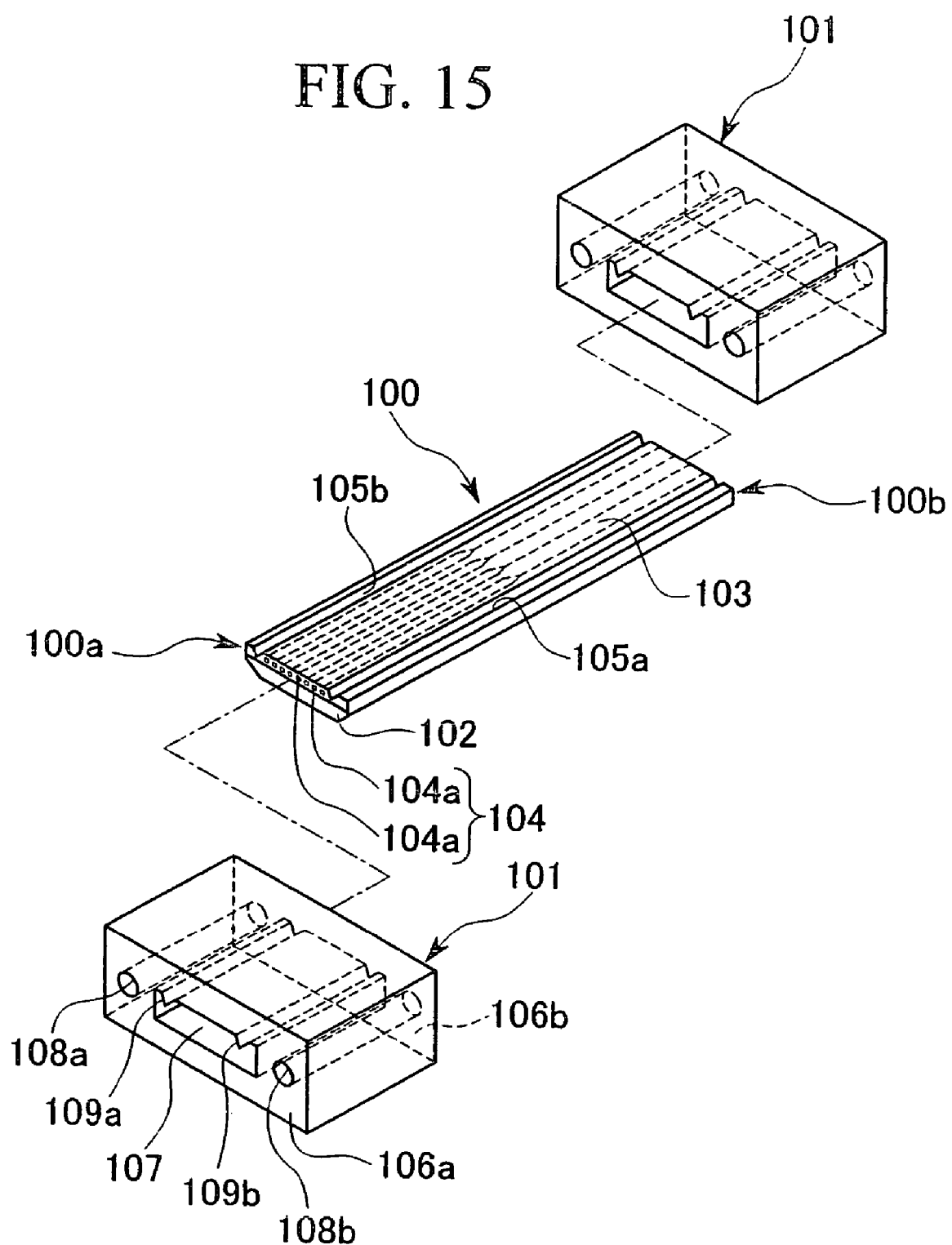
FIG. 15 is an exploded perspective drawing showing a conventional optical waveguide part.
Figure 16:
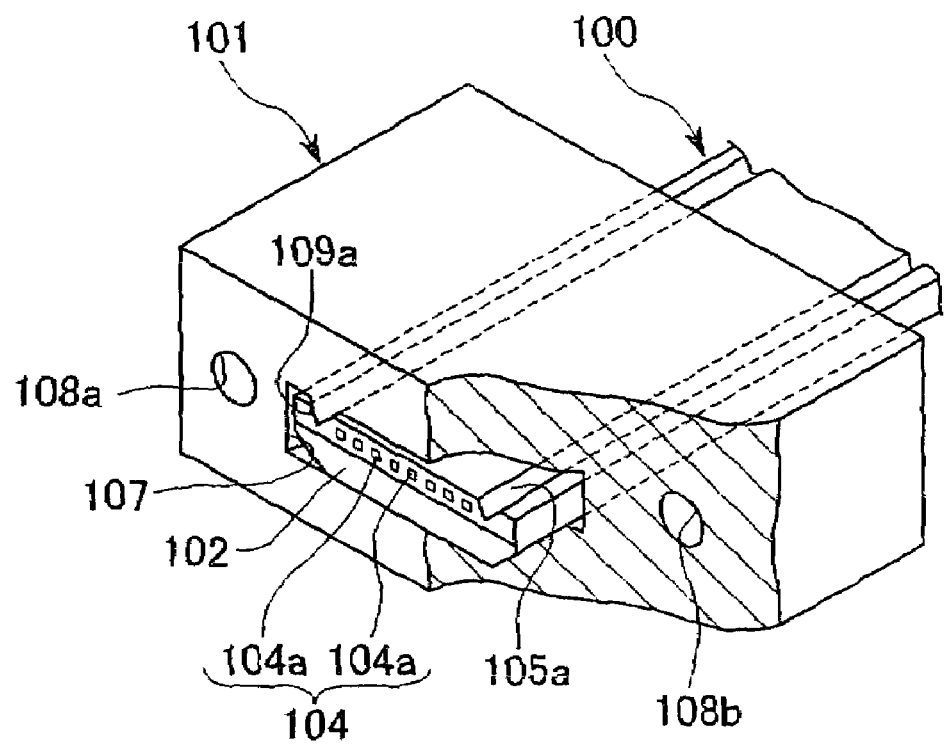
FIG. 16 is a partial cut-away perspective drawing showing a conventional optical waveguide part.
Figure 17:
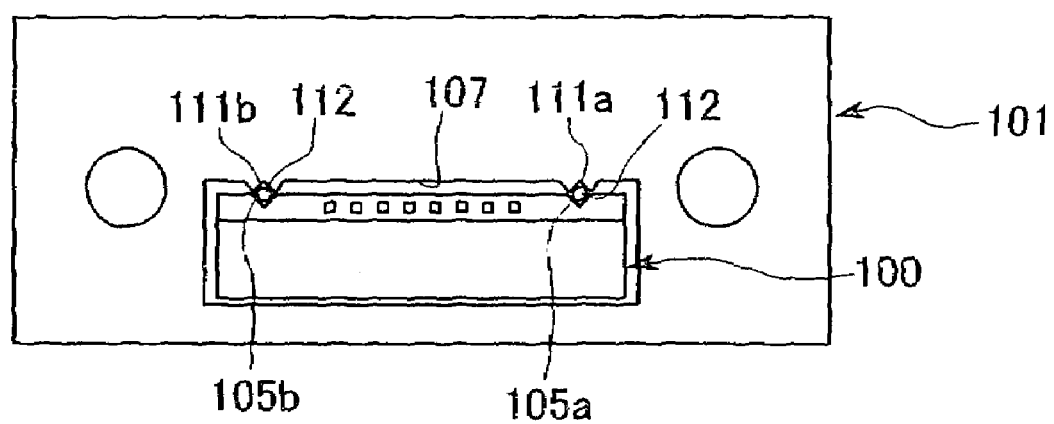
FIG. 17 is a cross-sectional drawing showing another example of a conventional optical waveguide part.
Figure 18:
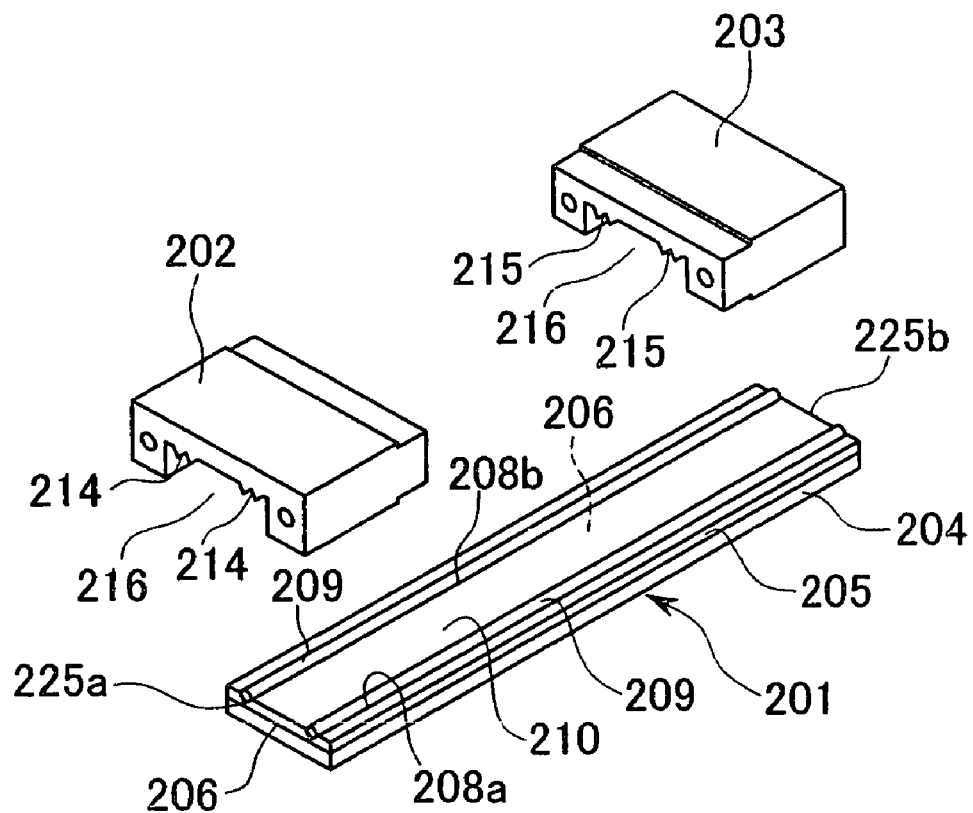
FIG. 18 an exploded perspective drawing showing a conventional optical waveguide apparatus.
Figure 19:
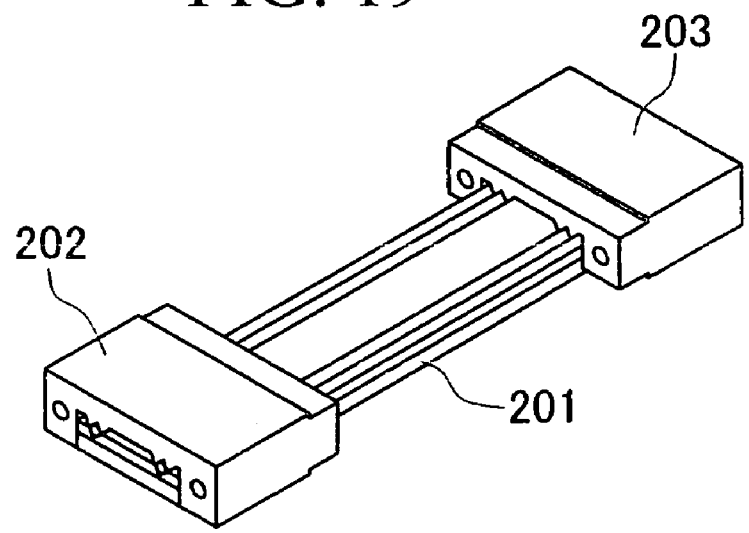
FIG. 19 is a perspective drawing showing a conventional optical waveguide apparatus.

Finally, as shown in FIG. 14D, the optical waveguide substrate 1 is formed by dicing the Si substrate 91.

Moreover, the Si sub-mount 31 can be formed by a method in line with this one.

Above, each embodiment of the optical module and the fabrication method thereof of the present invention have been explained referring to the figures. However, the specific structure is not limited to these embodiments, and modifications of the design are possible that do not depart from the gist of the present invention.

For example, a structure can be provided wherein a flexible member such as a flat spring is provided on the optical fiber connecting end member 2, and due to the urging force of this flexible member, the optical waveguide substrate 1 is pushed towards the inside of the through hole 13 of the optical fiber connecting end member 2. Thereby, the alignment of the optical waveguide substrate 1 and the optical fiber connecting end member 2 can be carried out more easily.

In addition, by providing the end surface of the optical fiber connecting end member 2 with an inclined surface, the influence of reflection at the connecting part between the optical fiber and the optical waveguide 4 can be attenuated.

In addition, at the time the optical waveguide substrate 1 is inserted into the through hole 13 of the optical fiber connecting end member 2, the end surface of the optical waveguide substrate 1 is attached protruding farther than the optical fiber connecting end member 2, then it is ground, and subsequently the end surface of the optical waveguide 4 can be finished protruding only slightly from the end surface 11a of the optical fiber connecting end member 2, and when the connection with the optical fiber is carried out, a physical connection can be attained, and the influence due to reflection can be attenuated.

In addition, in the case that there is concern about damage to the end surface of the optical waveguide 4, when the optical waveguide substrate 1 is inserted into the optical fiber connecting end member 2, the end surface of the optical waveguide substrate 1 is attached and fixed by being pulled by the end face 11a of the optical fiber connecting end member 2, and then the end surface of the optical waveguide substrate 1 is filled with transparent filler, and thereby the end surface of the optical waveguide 4 can be protected.

In addition, in the case that the Si sub-mount on which the optical element is mounted is inserted into the optical element housing member 41 or the optical fiber connecting end member 2, by sealing the Si sub-mount 31 and the optical element by a transparent resin and the like, the reliability of the optical module can be guaranteed.

As explained above, according to the substrate of the present invention, steps for positioning are formed on at least one side thereof, and thus when accommodating one end of the substrate in the hole of an optical fiber connecting end member and/or in the optical element housing member, a high degree of precision can be attained simply by the mechanical positioning of the relative positions of the substrate and the optical fiber connecting end member and/or the optical element housing member. Therefore, the optical waveguide and optical element of the substrate can be aligned with the optical axes of the optical fiber of the optical fiber connecting end member and/or the optical element of the optical element housing member without the optical elements having to emit light.

In addition, inclined grooves that incline towards the propagation direction of the light are formed on the optical waveguide, and a light reflecting device that reflects light propagating through the optical waveguide to the outside of the optical waveguide is provided on the inclined groove, and thus the light propagating through the optical waveguide can be easily extracted to the outside of the optical waveguide.

In addition, inclined grooves that incline towards the propagation direction of the light are formed on the optical waveguide, and a light selecting device is provided that selects light having a wavelength in a desired range from the light propagating through the optical waveguide and extracts it to the outside of the optical waveguide, and thus in the case that wavelength multiplexed light signals are propagating along the optical waveguide, a certain range of wavelengths can be extracted from this light signal, and the light can be received.

According to the optical fiber connecting end member of the present invention, because steps for positioning the substrate are formed in a hole that accommodates and fixes one end of the substrate, when the one end of the substrate is accommodated in the hole of the optical fiber connecting end member, a high degree of precision can be attained simply by the mechanical positioning of the relative positions of the substrate and the optical fiber connecting end member. Therefore, the optical axes of optical waveguide and optical element of the substrate can be aligned with that of optical axis of the optical fiber of the optical fiber connecting end member without the optical elements having to emit light.

According to the optical element housing member of the present invention, because steps for positioning the substrate are formed in a hole that accommodates and fixes one end of the substance, when the one end of the substrate is accommodated in the hole of the optical fiber connecting end member, a high degree of precision can be attained simply by the mechanical positioning of the relative positions of the substrate and the optical fiber housing member. Therefore, the optical axes of the optical waveguide and optical element of the substrate can be aligned with those of the optical fiber of the optical fiber housing member without the optical elements having to emit light.

According to the optical module of the present invention, because the optical fiber connecting end member and/or the optical element housing member of the present invention are provided, a high degree of precision can be attained simply by the mechanical positioning of the relative positions of the substrate and the optical fiber connecting end member and/or the optical element housing member. Therefore, the optical axes of optical waveguide and optical element of the substrate can be aligned with those of the optical fiber of the optical fiber connecting end member and/or the optical element of the optical element housing member without the optical elements having to emit light.

In addition, because the substrate is urged towards the optical fiber connecting end member by the urging force of a flexible member, the alignment of the steps of the substrate and the optical fiber connecting end member can be carried out more easily.

According to the fabrication method of the substrate of the present invention, because a step for positioning is formed on at least one side of the substrate by anisotropic etching, a high precision step can be easily formed on the substrate.

What is claimed is:

1. An optical module, comprising:
a substrate having first steps thereon;
a plane light emitting element mounted on said substrate;
a plane light receiving element mounted on said substrate; and
an optical fiber connecting member having a notch therein and having second steps in the notch, wherein:
said substrate is positioned in the notch of said optical fiber connecting member, with the first steps abutting the second steps, and
when said optical module is connected to an optical fiber connector, and first and second optical fibers are received in the optical fiber connector, said light emitting element is optically connected to the first optical fiber, and said light receiving element is optically connected to the second optical fiber.

2. The optical module according to claim 1 wherein:
said optical fiber connecting member has a pair of guide holes extending therethrough in a direction perpendicular to the planes of said light emitting element and said light receiving element and adapted for passage therethrough of guide pins to connect said optical module with the optical fiber connector, and
said optical module is connected to the optical fiber connector by guide pins passing through the guide holes.

3. The optical module according to claim 1, further comprising a lens within the notch of said optical fiber connecting member, adjacent said light emitting element and said light receiving element.

* * * * *